(12) United States Patent
Kimelman et al.

(10) Patent No.: US 7,010,789 B1
(45) Date of Patent: Mar. 7, 2006

(54) INDEPENDENT NET TASK IDENTIFICATION FOR EFFICIENT PARTITION AND DISTRIBUTION

(75) Inventors: Douglas N. Kimelman, Yorktown Heights, NY (US); Vadakkedathu T. Rajan, Briarcliff Manor, NY (US); Tova Roth, Woodmere, NY (US); Mark N. Wegman, Ossining, NY (US); Karin Hogstedt, Chester, NJ (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 09/676,422

(22) Filed: Sep. 29, 2000

(51) Int. Cl.
*G06F 9/46* (2006.01)
(52) U.S. Cl. ............... 718/100; 718/102; 718/104
(58) Field of Classification Search ............. 718/100, 718/102, 106, 105, 104; 709/200, 201–203, 709/217–219; 719/310
See application file for complete search history.

(56) References Cited

U.S. PATENT DOCUMENTS

| | | | |
|---|---|---|---|
| 5,021,947 A * | 6/1991 | Campbell et al. ............. 712/25 |
| 5,392,429 A * | 2/1995 | Agrawal et al. ............ 708/446 |
| 6,230,303 B1 * | 5/2001 | Dave ............................. 716/7 |
| 6,253,372 B1 * | 6/2001 | Komatsu et al. ............ 717/149 |
| 6,266,053 B1 * | 7/2001 | French et al. ............ 715/500.1 |
| 6,437,804 B1 * | 8/2002 | Ibe et al. ..................... 345/736 |
| 6,629,123 B1 * | 9/2003 | Hunt .......................... 709/106 |

OTHER PUBLICATIONS

M. Padberg et al., "An Efficient Algorithm For The Minimum Capacity Cut Problem", *Mathematical Programming* 47 (1990) pps. 19-36 North-Holland.
E. Dahlhaus et al., "The Complexity of Multiterminal Cuts", 1994 Society for Industrial and Applied Mathematics, pps. 864-894.

* cited by examiner

*Primary Examiner*—Meng-Al T. An
*Assistant Examiner*—Syed J Ali
(74) *Attorney, Agent, or Firm*—Law Office of Charles W. Peterson, Jr.; Louis P. Herzberg

(57) ABSTRACT

A task management system, method and computer program product for determining optimal placement of task components on multiple machines for task execution, particularly for placing program components on multiple computers for distributed processing. First, a communication graph is generated representative of the computer program with each program unit (e.g., an object) represented as a node in the graph. Nodes are connected to other nodes by edges representative of communication between connected nodes. A weight is applied to each edge, the weight being a measure of the level of communication between the connected edges. Terminal nodes representative of the multiple computers are attached to the communication graph. Then, the communication graph is divided into independent nets and a min cut is found for each independent net. The min cut for the communication graph is the combination of the min cuts for all of the independent nets. Finally, program components which may be a single program unit or an aggregate of units are placed on computers according to the communication min cut.

25 Claims, 8 Drawing Sheets

INDEPENDENT NET TASK IDENTIFICATION FOR EFFICIENT PARTITION AND DISTRIBUTION

RELATED APPLICATION

The present application is related to U.S. patent application No. 09/676,423 entitled "MACHINE CUT TASK IDENTIFICATION FOR EFFICIENT PARTITION AND DISTRIBUTION" to Rajan et al., now issued as U.S. Pat. No. 6,823,510; U.S. patent application Ser. No. 09/676,425 entitled "NET ZEROING FOR EFFICIENT PARTITION AND DISTRIBUTION" to Roth et al., now issued as U.S. Pat. No. 6,862,731; and U.S. patent application No. 09/676,424 entitled "DOMINANT EDGE IDENTIFICATION FOR EFFICIENT PARTITION AND DISTRIBUTION" to Wegman et al., now issued as U.S. Pat. No. 6,817,016 all filed coincident herewith and assigned to the assignee of the present invention.

BACKGROUND OF THE INVENTION

1. Field of the Invention

The present invention generally relates to distributed processing and more particularly, the present invention relates to efficiently assigning tasks across multiple computers for distributed processing.

2. Background Description

Any large, multifaceted project, such as a complex computer program, may be segmented into multiple smaller manageable tasks. The tasks then may be distributed amongst a group of individuals for independent completion, e.g., an engineering design project, distributed processing or, the layout of a complex electrical circuit such as a microprocessor. Ideally, the tasks are matched with the skills of the assigned individual and each task is completed with the same effort level as every other task. However, with such an ideal matched task assignment, intertask communication can become a bottleneck to project execution and completion. Thus, to minimize this potential bottleneck, it is important to cluster together individual tasks having the highest level of communication with each other. So, for example, in distributing eight equivalent tasks to pairs of individuals at four locations, (e.g., eight design engineers in four rooms) optimally, pairs of objects or tasks with the highest communication rate with each other are assigned to individual pairs at each of the four locations.

Many state of the art computer applications are, by nature, distributed applications. End-users sit at desktop workstations or employ palmtop information appliances on the run, while the data they need to access resides on distant data servers, perhaps separated from these end-users by a number of network tiers. Transaction processing applications manipulate data spread across multiple servers. Scheduling applications are run on a number of machines that are spread across the companies of a supply chain, etc.

When a large computer program is partitioned or segmented into modular components and the segmented components are distributed over two or more machines, for the above mentioned reasons, component placement can have a significant impact on program performance. Therefore, efficiently managing distributed programs is a major challenge, especially when components are distributed over a network of remotely connected computers. Further, existing distributed processing management software is based on the assumption that the program installer can best decide how to partition the program and where to assign various program components. However, experience has shown that programmers often do a poor job of partitioning and component assignment.

So, a fundamental problem facing distributed application developers is application partitioning and component or object placement. Since communication cost may be the dominant factor constraining the performance of a distributed program, minimizing inter-system communication is one segmentation and placement objective. Especially when placement involves three or more machines, prior art placement solutions can quickly become unusable, i.e., what is known as NP-hard. Consequently, for technologies such as large application frameworks and code generators that are prevalent in object-oriented programming, programmers currently have little hope of determining effective object placement without some form of automated assistance. En masse inheritance from towering class hierarchies, and generation of expansive object structures leaves programmers with little chance of success in deciding on effective partitioning. This is particularly true since current placement decisions are based solely on the classes that are written to specialize the framework or to augment the generated application.

Furthermore, factors such as fine object granularity, the dynamic nature of object-based systems, object caching, object replication, ubiquitous availability of surrogate system objects on every machine, the use of factory and command patterns, etc., all make partitioning in an object-oriented domain even more difficult. In particular, for conventional graph-based approaches to partitioning distributed applications, fine-grained object structuring leads to enormous graphs that may render these partitioning approaches impractical.

Finally, although there has been significant progress in developing middleware and in providing mechanisms that permit objects to inter-operate across language and machine boundaries, there continues to be little to help programmers decide object-system placement. Using state of the art management systems, it is relatively straightforward for objects on one machine to invoke methods on objects on another machine as part of a distributed application. However, these state of the art systems provide no help in determining which objects should be placed on which machine in order to achieve acceptable performance. Consequently, the initial performance of distributed object applications often is terribly disappointing. Improving on this initial placement performance is a difficult and time-consuming task.

Accordingly, there is a need for a way of automatically determining the optimal program segmentation and placement of distributed processing components to minimize communication between participating distributed processing machines.

SUMMARY OF THE INVENTION

It is therefore a purpose of the present invention to improve distributed processing performance;

It is another purpose of the present invention to minimize communication between distributed processing machines;

It is yet another purpose of the invention to improve object placement in distributed processing applications;

It is yet another purpose of the invention to determine automatically how objects should best be distributed in distributed processing applications;

it is yet another purpose of the invention to minimize communication between objects distributed amongst multiple computers in distributed processing applications.

The present invention is a task management system, method and computer program product for determining optimal placement of task components on multiple machines for task execution, particularly for placing program components on multiple computers for distributed processing. First, a communication graph is generated representative of the computer program with each program unit (e.g., an object) represented as a node in the graph. Nodes are connected to other nodes by edges representative of communication between connected nodes. A weight is applied to each edge, the weight being a measure of the level of communication between the connected edges. Terminal nodes representative of the multiple computers are attached to the communication graph. Then, the communication graph is divided into independent nets and a min cut is found for each independent net. The min cut for the communication graph is the combination of the min cuts for all of the independent nets. Finally, program components which may be a single program unit or an aggregate of units are placed on computers according to the communication min cut.

BRIEF DESCRIPTION OF THE DRAWINGS

The foregoing and other objects, aspects and advantages will be better understood from the following detailed preferred embodiment description with reference to the drawings, in which.

DETAILED DESCRIPTION OF PREFERRED EMBODIMENTS OF THE INVENTION

As referred to herein, a communication graph is a graphical representation of a multifaceted task such as a computer program. Each facet of the task is an independent task or object that is represented as a node and communication between tasks or nodes is represented by a line (referred to as an edge) between respective communicating nodes. Participating individuals (individuals receiving and executing distributed tasks) are referred to as terminal nodes or machine nodes. A net is a collection of nodes connected together by edges. Two nets are independent if none of the non-terminal nodes of one net shares an edge with a non-terminal node of the other. Thus, for example, a communication graph of a computer program might include a node for each program object and edges would be between communicating objects, with edges not being included between objects not communicating with each other. In addition, a weight indicative of the level of communication between the nodes may be assigned to each edge. Graphical representation and modeling of computer programs is well known in the art.

Figure 1:
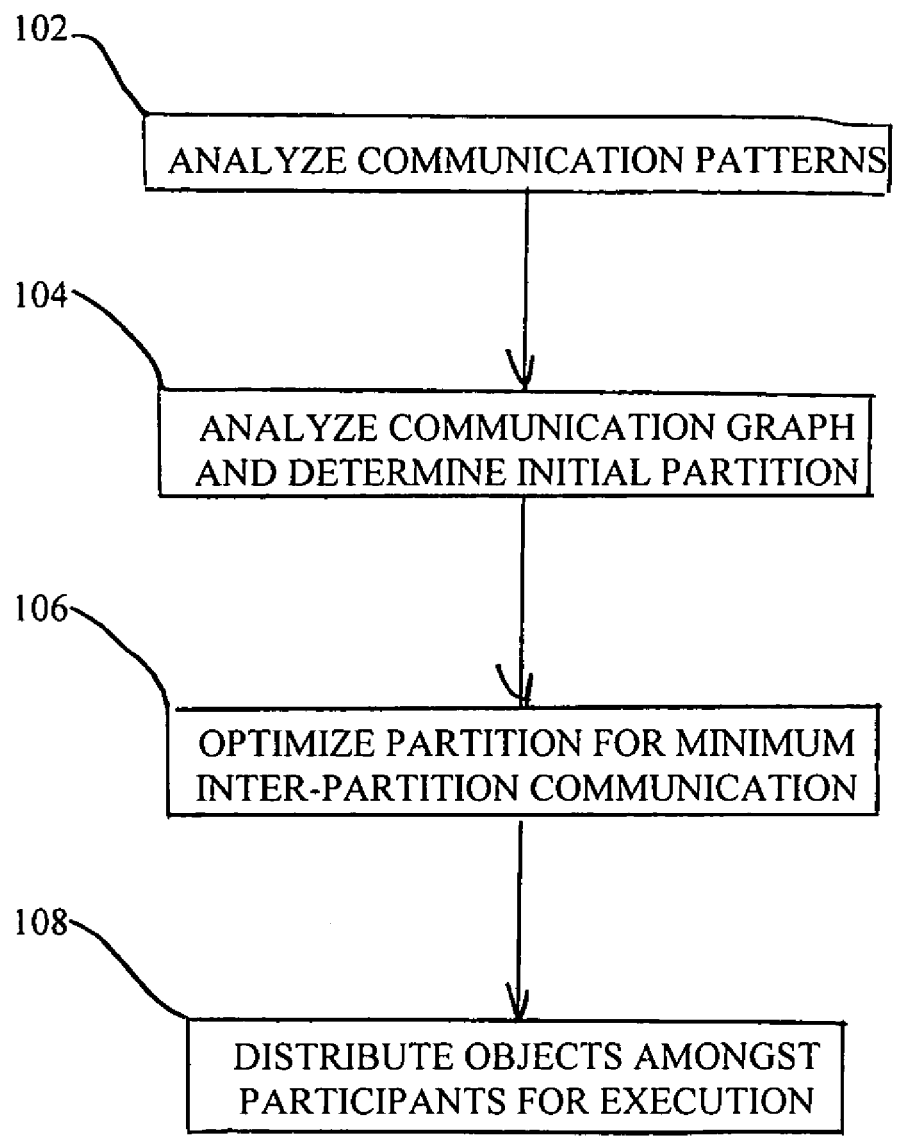
FIG. 1 is an example of a flow diagram of the preferred embodiment of the present invention wherein a program is segmented, initially, and initial segments are distributed to and executed on multiple computers.

Referring now to the drawings, and more particularly, FIG. 1 is an example of a flow diagram 100 of the preferred embodiment of the present invention wherein a program is segmented, initially, and initial segments are distributed to and executed on multiple computers. First, in step 102 the communication patterns of a program are analyzed to form a communication graph. Then, in step 104, the traces of the communication graph are analyzed, and an initial partition is determined. In step 106, the partition is optimized for minimum interpartition communication. In step 108, the individual objects are distributed amongst participants for execution according to the optimize partition of step 106.

A component refers to an independent unit of a running program that may be assigned to any participating individual, e.g., computers executing objects of a distributed program. Thus, a component may refer to an instance of an object in an object oriented program, a unit of a program such as Java Bean or Enterprise Java Bean or, a larger collection of program units or components that may be clustered together intentionally and placed on a single participating machine. Further, a program is segmented or partitioned into segments that each may be a single component or a collection of components. After segmenting, analyzing the segments and assigning each of segments or components to one of the multiple participating machines or computers according to the present invention, the final machine assignment is the optimal assignment.

Thus, a typical communication graph includes multiple nodes representative of components with weighted edges between communicating nodes. Determining communication between components during program execution may be done using a typical well known tool available for such determination. Appropriate communication determination tools include, for example, Jinsight, for Java applications that run on a single JVM, the Object Level Tracing (OLT) tool, for WebSphere applications or, the monitoring tool in Visual Age Generator.

Figure 2A:
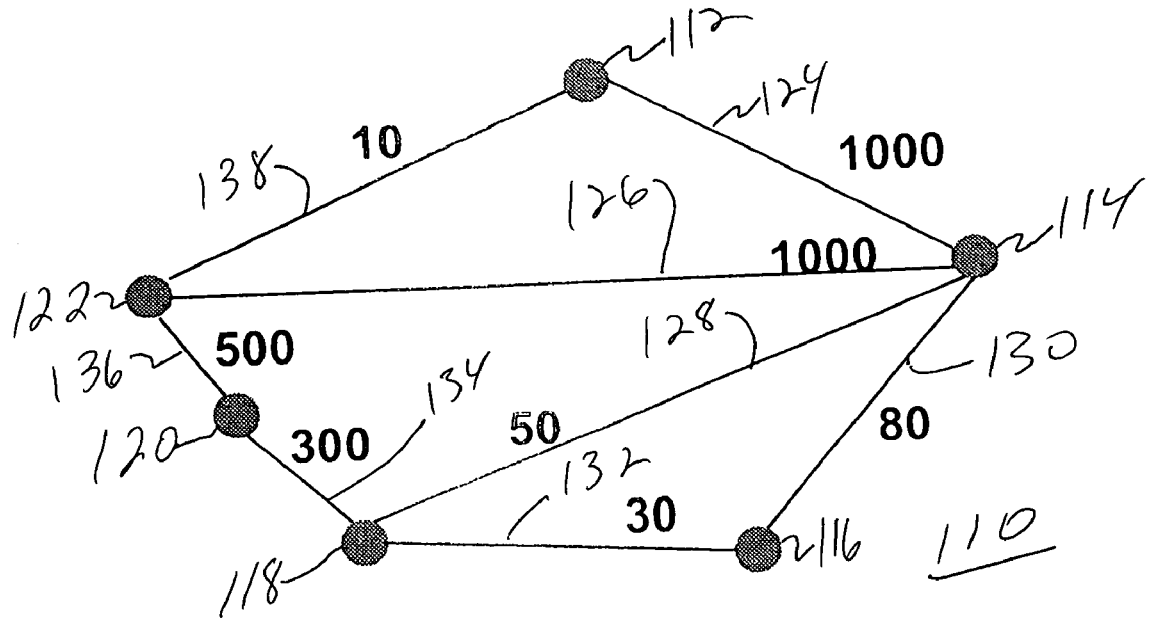
FIGS. 2A–C show an example of a communication graph.
Figure 2B:
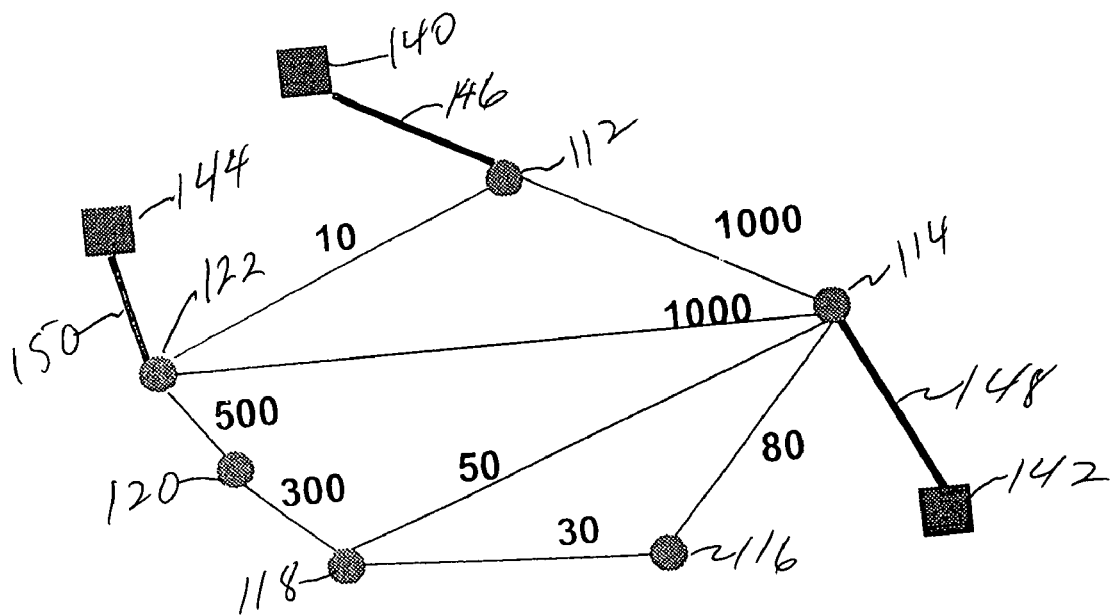
Figure 2C:
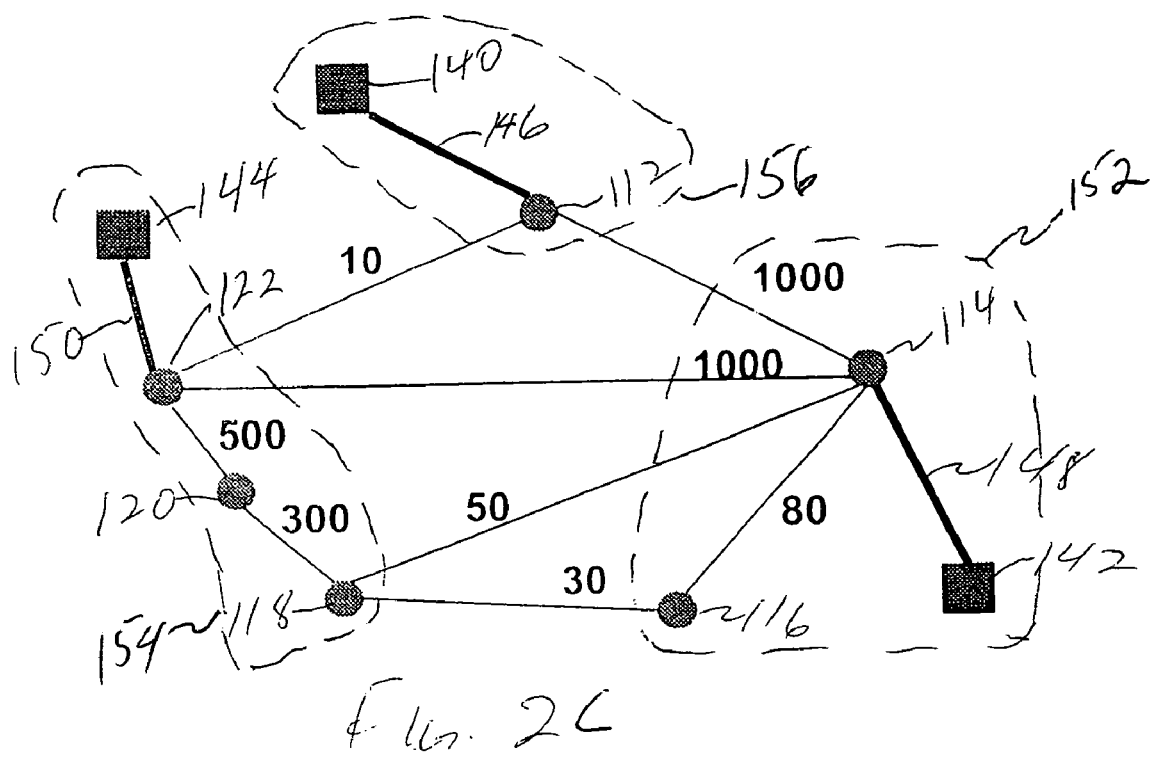

FIGS. 2A–C show an example of a communication graph of a net 110 that includes multiple nodes 112, 114, 116, 118, 120 and 122. Each node 112, 114, 116, 118, 120 and 122 represents a program component connected to communication edges 124, 126, 128, 130, 132, 134, 136 and 138 to form the net 110. Adjacent nodes are nodes that share a common edge, e.g., nodes 114 and 122 share edge 126. Each edge 124, 126, 128, 130, 132, 134, 136 and 138 has been assigned a weight proportional to, for example, the number of messages between the adjacent components.

In FIG. 2B, Machine nodes 140, 142 and 144 representative of each participating machine (three in this example) are shown connected by edges 146, 148, 150. Initially, anode 112, 114, 116, 118, 120 and 122 may be placed on a machine 140, 142, 144 by adding an edge 146, 148, 150 with infinite weight (indicating constant communication) between the node and the machine. Typically, initial assignment places nodes with specific functions (e.g., database management) on a machine suited for that function. After the initial placement assigning some nodes 112, 114 and 122 to machines 140, 142, 144, other nodes 116, 118, 120 are assigned to machines 140, 142, 144, if they communicate heavily with a node 112, 114, 122 already assigned to that machine 140, 142, 144. Additional assignment is effected by selectively collapsing edges, combining the nodes on either end of the collapsed edge and re-assigning edges that were attached to one of the two former adjacent nodes to the combined node. When assignment is complete, all of the nodes 112, 114, 116, 118, 120 and 122 will have been placed on one of the machines at terminal nodes 140, 142, 144 and the final communication graph may be represented as terminal nodes 140, 142, 144 connected together by communication edges.

For this subsequent assignment, the graph is segmented by cutting edges and assigning nodes to machines as represented by 152, 154 and 156 in FIG. 2C to achieve what is known in the art as a minimal cut set or min cut set. A cut set is a set of edges that, if removed, eliminate every path between a pair of terminal nodes (machine nodes) in the graph. A min cut set is a cut set wherein the sum of the weights of the cut set edges is minimum. While there may be more than one min cut set, the sum is identical for all min cut sets. A min cut may be represented as a line intersecting the edges of a min cut set. So, in the example of FIG. 2C, the sum of the weights of edges 124, 126, 128, 132 and 138 is 2090, which is cost of the cut and is representative of the total number of messages that would be sent between machines at terminal nodes 140, 142, 144 with this particular placement. The min cut identifies the optimum component placement with respect to component communication. While selecting a min cut set may be relatively easy for this simple example, it is known to increase in difficulty exponentially with the number of nodes in the graph.

Figure 3:
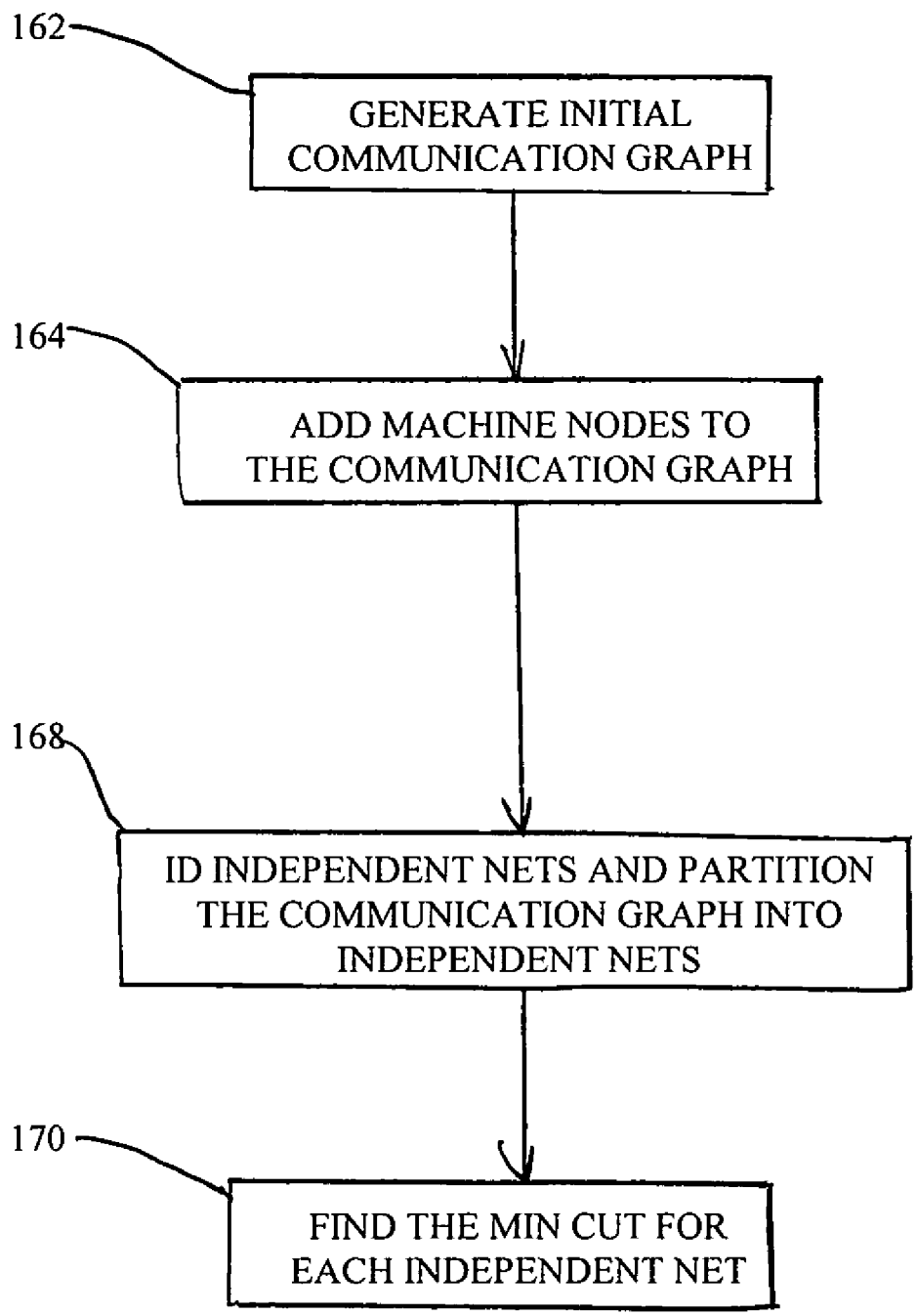
FIG. 3 is a flow diagram of the optimization steps for determining an optimum distribution of program components.

FIG. 3 is a flow diagram 160 of the optimization steps for determining an optimum distribution of program components to individual participating computers according to a preferred embodiment of the present invention. First, in step 162, an initial communication graph is generated for the program. Then, in step 164 machine nodes are added to the communication graph. As noted above, certain types of components are designated, naturally, for specific host machine types, e.g., graphics components are designated for clients with graphics capability or, server components are designated for a data base server. After assigning these host specific components to host nodes, in step 168 independent nets are identified and the communication graph is partitioned into the identified independent nets. In step 170 a min cut is found for each independent net, the min cuts for all of the independent nets being the min cut for the whole communication graph.

Figure 4:
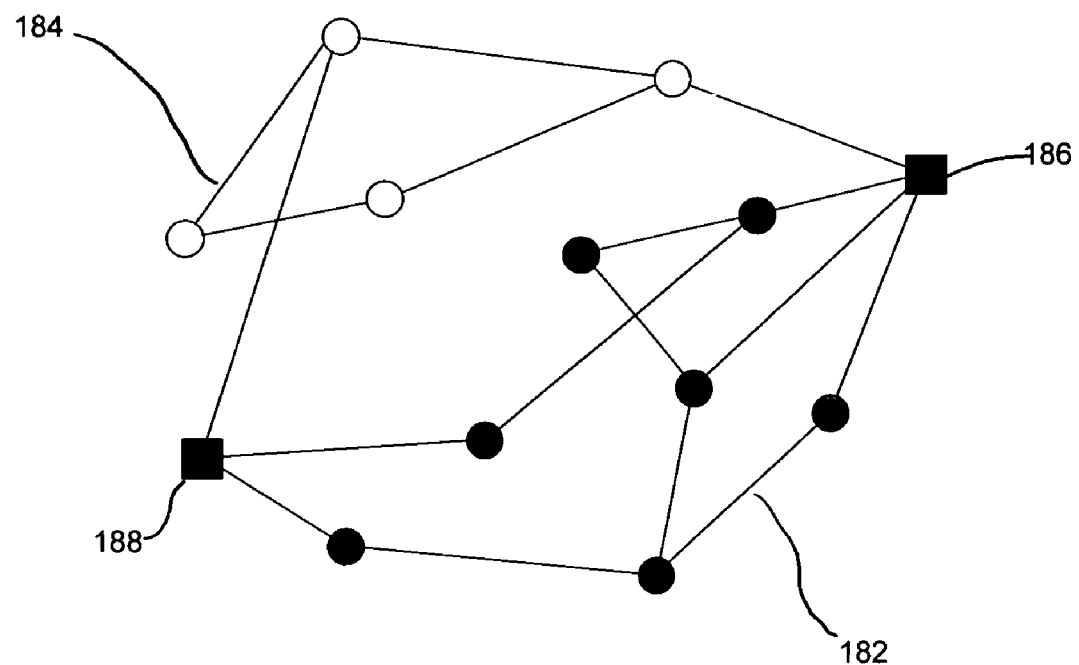
FIG. 4 is an example of a communication net that includes two independent nets.

FIG. 4 is an example of a communication net 180 that includes two independent nets 182, 184. Independent net 182 includes all of the nodes represented by black dots and all of the corresponding connecting edges. Independent net 184 includes all of the nodes represented by white dots and all of the corresponding connecting edges. Both independent nets 182, 184 include terminal nodes 186, 188.

Figure 5:
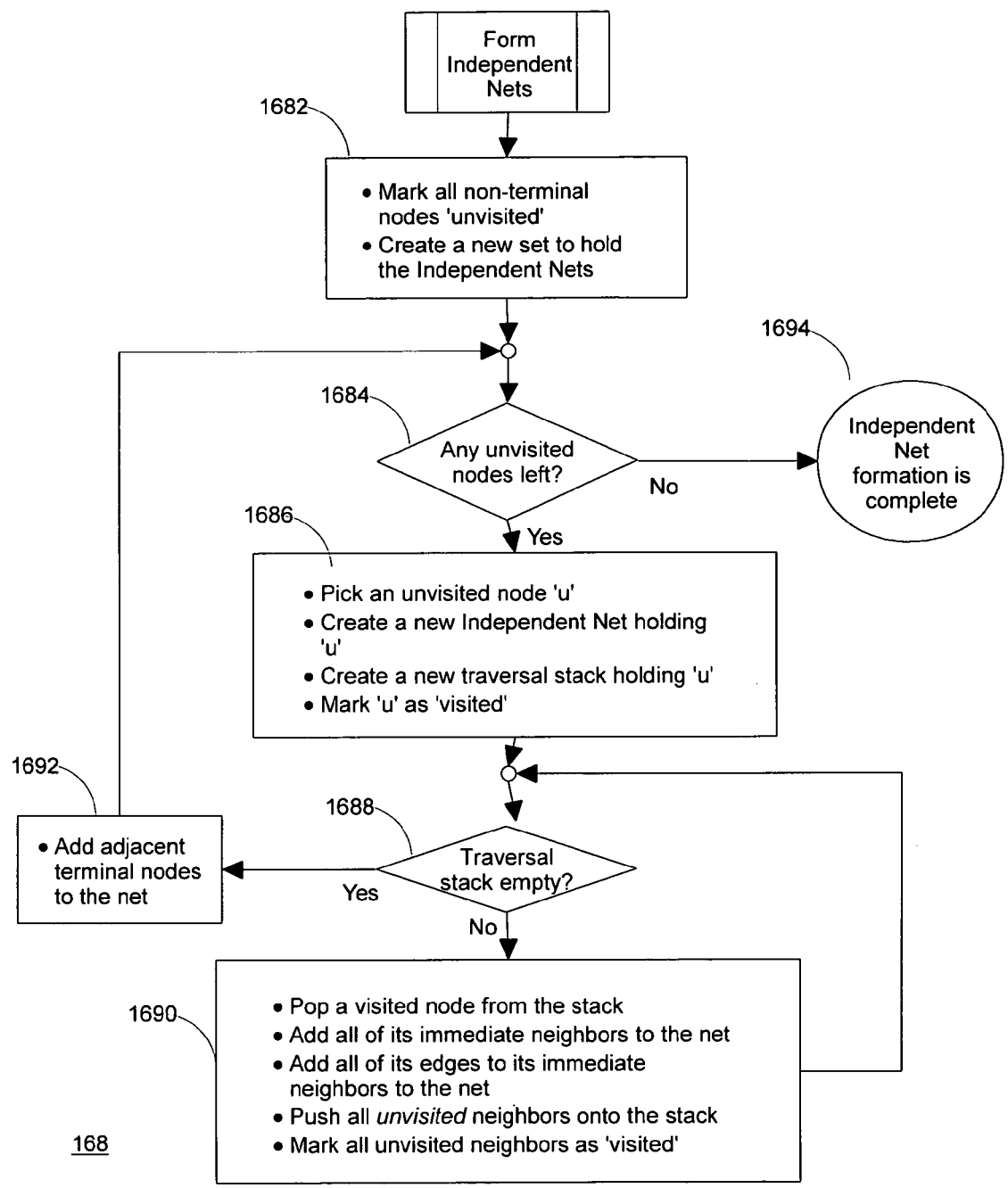
FIG. 5 shows the steps of identifying independent nets.

FIG. 5 show the steps of identifying independent nets of step 168 of FIG. 3. The communication graph is partitioned into subgraphs that are independent nets by repeatedly picking a "seed node" from nodes remaining in the communication graph and branching out until terminal nodes have been reached along all paths. As noted above, an independent net is a subset of components that do not communicate with any other subset of components. Thus, it should be noted that the communication graph may or may not be divisible into independent nets. However, independent net identification begins with initialization in step 1682 by marking all the unallocated nodes (nodes that have not been assigned to a terminal node) as being unvisited. Also, during this initialization step 1682, a set of independent nets (e.g., a list of subgraphs) is created and initialized as empty or null set. Since all unallocated nodes have been initially marked unvisited, unvisited nodes are found in the first instance of step 1684. So, in step 1686 an unvisited node (u) is selected as a starting point to identify an independent net and the independent net is entered into the set of nets. At this point, a new traversal stack is initially created with selected node u being the sole first entry and u is marked as visited. The traversal stack maintains a list of the outer visited or perimeter non-terminal nodes of the independent net and is empty when the independent net has been fully identified.

So, except for the trivial case where the independent net is a single node net, when the traversal stack is first checked for any independent net in step 1688, the traversal stack is not empty. Until the traversal stack is found to be empty in step 1688, one visited node is popped from the stack in step 1690. All of the immediate neighbors (adjacent nodes) to the popped node are pushed onto the traversal stack, marked as visited and, thereby, perimeter nodes included in the independent net being formed. Correspondingly, all of the edges between the popped node and its newly added neighbors also are included in the independent net. Repeatedly, the traversal stack is checked in step 1688, perimeter nodes are popped from the stack and any adjacent nodes are added to the stack as perimeter nodes in step 1690. This is repeated until the traversal stack is found to be empty in step 1688 and gathering of non-terminal nodes for this independent net is complete. So, in step 1692 any terminal node incident to an edge already in the net are added. After step 1692, returning to step 1684 if any unvisited nodes remain, then additional independent nets remain and independent net identification continues in step 1686. However, if no unvisited nodes are found in step 1684, then all independent nets have been identified, only terminal nodes are perimeter nodes and the independent net identification step 168 is complete in step 1694. The output of step 168 is a set of independent nets in the communication graph. If the output is only a single independent net, then no simplification of the communication graph occurred.

Figure 6A:
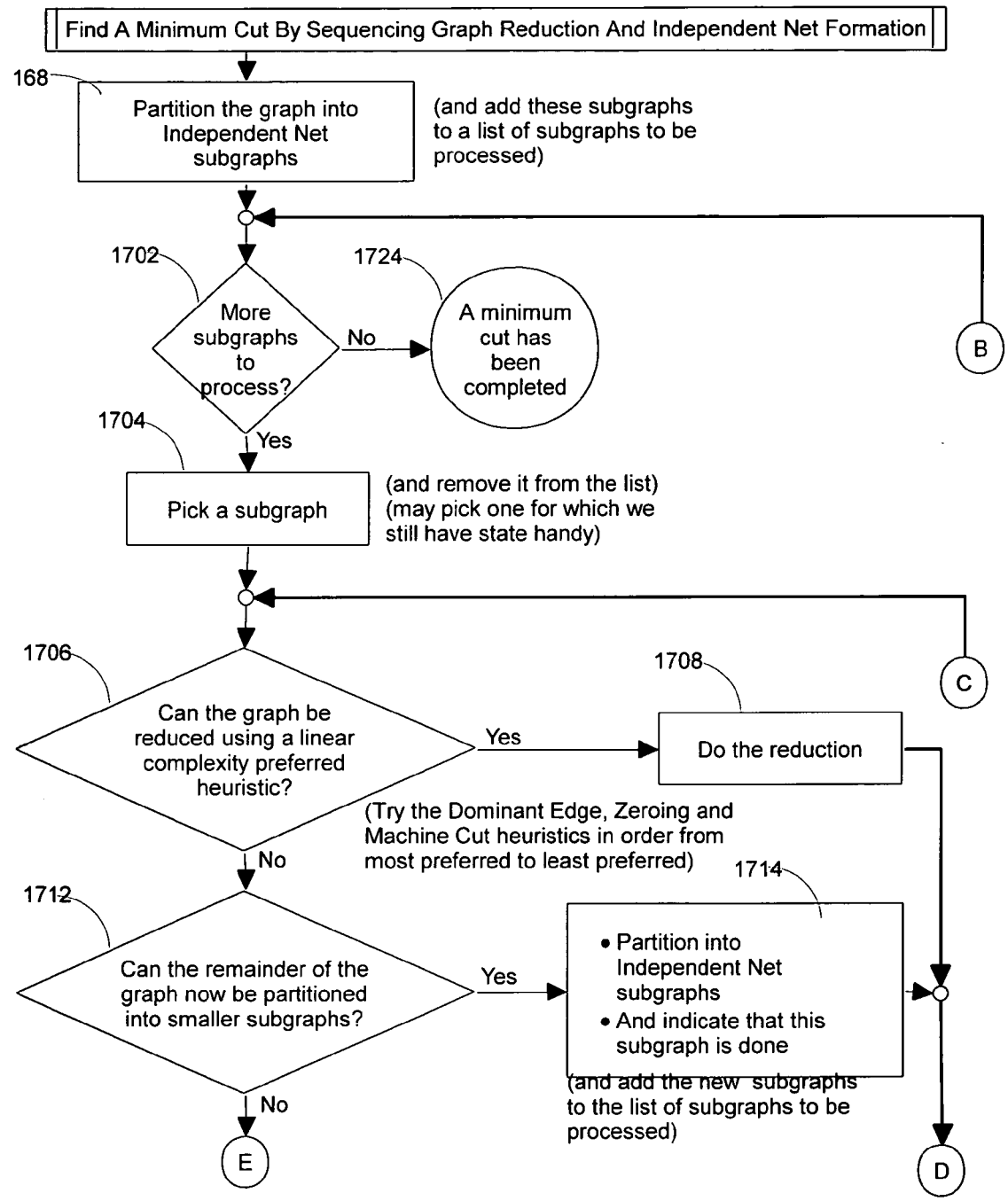
FIGS. 6A–B show a flow diagram showing a detailed example of the steps in finding the min cut for each independent net.
Figure 6B:
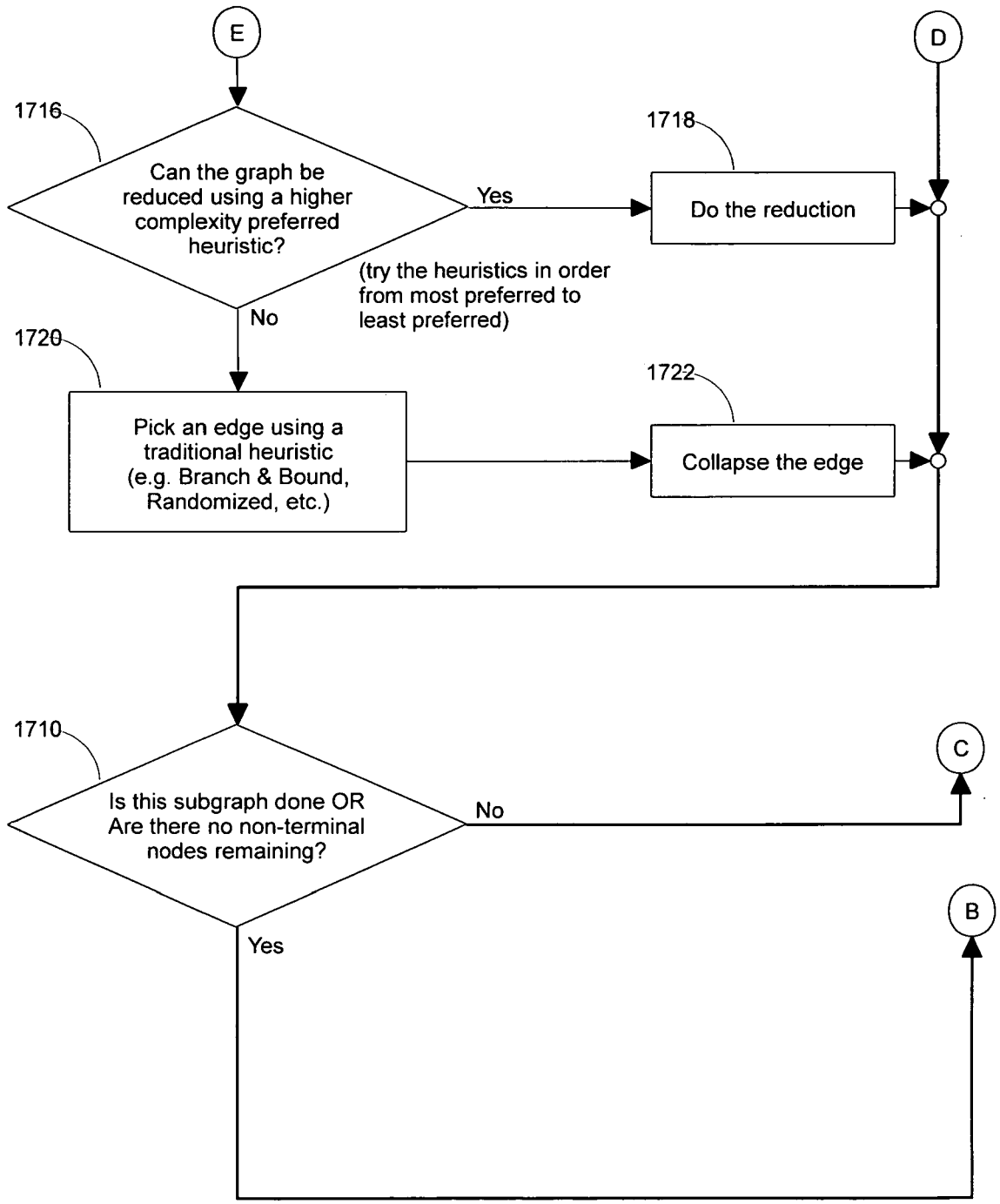

FIGS. 6A–B are a flow diagram showing a detailed example of the steps in finding the min cut in step 170 for each independent net to achieve an optimum program component distribution to individual participating computers according to the preferred embodiment of the present invention. In this example, a multiway minimum cut of the communication graph is identified by sequencing graph reduction methods and independent net formation. In this way, a complex communication graph can be reduced quickly, preferably using linear complexity heuristics or methods, to a small manageable size to allow finding the multiway minimum cut very quickly using any well known method, i.e:, methods that have higher computational complexity but, would otherwise be totally impractical on the full communication graph absent the reduction of the present invention.

So, after isolating independent nets in step 168, each independent net being listed, for example, as such in a subgraph list, the subgraph list is passed to step 170. First, in step 1702 the subgraph list is checked to determine if the min cut has been found for all of the subgraphs, i.e., the subgraph list is empty. It is understood that as the min cut step 170 progresses, some subgraphs may be further divided into smaller subgraphs and those smaller subgraphs included in the subgraph list. However, in the first pass through step 1702 the min cut will not have been found for at least one subgraph. So in step 1704, one independent net or subgraph is selected and removed from the subgraph list. This selection may be arbitrary or based on available subgraph internal state information. Then, in step 1706 the selected independent net is checked using a linear complexity method (e.g., M. Padberg and G. Rinaldi "An Efficient Algorithm for the Minimum Capacity Cut Problem", *Math. Prog.* 47, 1990, pp. 19–36) to determine if it can be reduced in step 1708.

Preferably, however, the linear complexity methods employed in step 1706 include U.S. patent application Ser. No. 09/676,423 entitled "MACHINE CUT TASK IDENTIFICATION FOR EFFICIENT PARTITION AND DISTRIBUTION" (Machine Cut) to Rajan et al., now issued as U.S. Pat. No. 6,823,510; U.S. patent application Ser. No. 09/676,425 entitled "NET ZEROING FOR EFFICIENT PARTITION AND DISTRIBUTION" (Zeroing) to Roth et al., now issued as U.S. Pat. No. 6,862,731; and U.S. patent application No. 09/676,424 entitled "DOMINANT EDGE IDENTIFICATION FOR EFFICIENT PARTITION AND DISTRIBUTION" (Dominant Edge) to Wegman et al., now issued as U.S. Pat. No. 6,817,016, filed coincident herewith, assigned to the assignee of the present invention and incorporated herein by reference. Most preferably, in step 1708 the Dominant Edge method is used first, followed by Zeroing and then, by the Machine Cut method. This reduction many involve collapsing edges (Dominant Cut and Machine Cut) or reducing edge weights (Zeroing) and then collapsing edges. To reach a solution more quickly, on each pass through step 1706, only nodes and edges of a subgraph that were adjacent to areas reduced previously in step 1708 are rechecked.

After reducing the subgraph using one or more linear complexity methods, in step 1710 in FIG. 6B, the subgraph is checked to determine if, as a result of the reduction, the subgraph is complete. The subgraph is complete either, if the min cut has been found or, if the reduction of step 1708 has partitioned the graph into independent nets. So, if the subgraph is complete, returning to step 1702, the min cut step 170 continues. Otherwise, returning to step 1706 the reduced subgraph is again checked to determine if it can be reduced using a linear complexity method, e.g., using the Dominant Cut and/or Machine cut after reducing edge weights.

If it is determined in step 1706 that the subgraph cannot be reduced using a linear complexity method, then, in step 1712 the subgraph is checked to determine if it may be further divided into independent nets and, if so, it is divided into independent subgraphs in step 1714 as described above with reference to FIG. 5. Initially, as a result of the original independent net identification of step 168, the subgraphs cannot be further divided into independent nets. However, as subgraphs are simplified, e.g., though reduction using a linear complexity method in step 1708, the reduced subgraph may be further divided into independent subgraphs. So, if in step 1712 it is determined that the subgraph includes two or more independent nets, then in step 1714, the subgraph is partitioned into independent nets which are added to the subgraph list and the partitioned subgraph is complete. Thus, in step 1710, when the subgraph is checked, it is determined to be complete and, returning to step 1702, the min cut step 170 continues.

In step 1712, if it is determined that the subgraph is not further partitionable, the subgraph is checked in step 1716 whether it may be reduced using a more complex reduction method than was used in step 1708. A subgraph that has reached this point cannot be further reduced by the linear complexity methods of step 1708 and, further, the subgraph is not partitionable into a number of smaller subgraphs, which otherwise might be further reducible using the linear methods. So, in step 1718 the subgraph is reduced using well known more complex methods, such as, for example, the method described by Dahlhaus et al. in "The Complexity of Multiterminal Cuts", *SIAM Journal on Computing* 23, 1994, pp. 864–94. Again, in step 1710, after reducing the subgraph using these more complex methods, the subgraph is checked to determine if it is complete as a result of the reduction and, if so, returning to step 1702, where if any independent nets remain in the subgraph list, the min cut step 170 continues. Otherwise, if the subgraph is not complete, returning to step 1706 the reduced subgraph is again checked to determine if it can be further reduced using a linear complexity method.

However, if in step 1716 it is determined that more complex methods would not be effective in further reducing the subgraph, then, in step 1720, traditional or deterministic methods that may be exact or approximate, e.g. Branch & Bound, Randomized selection, etc., are applied to select an edge to be collapsed. In step 1722 the selected edge is collapsed and the modified subgraph is checked to determine if it is complete as a result of this reduction. If it is complete, returning to step 1702, if any independent nets remain in the subgraph list, the min cut step 170 continues. Otherwise, if the subgraph is not complete, returning to step 1706 the reduced subgraph is again checked to determine if it can be reduced using a linear complexity method. When in step 1702, the subgraph list is found empty, the min cut step 170 is complete in step 1710 in FIG. 6A and a min cut for the communication graph has been found.

The reduction method of the preferred embodiment reduces the number of independent components in the communication graph of a complex program. In the best case, an appropriate allocation of every component in the program is provided. However, even when best case is not achieved, the preferred embodiment method may be combined with other algorithms and heuristics such as the branch and bound algorithm or the Kernighan-Lin heuristic to significantly enhance program performance. Experimentally, the present invention has been applied to communication graphs of components in several programs with results that show significant program allocation improvement, both in the quality of the final solution obtained and in the speed in reaching the result.

Although the preferred embodiments are described hereinabove with respect to distributed processing, it is intended that the present invention may be applied to any multi-task project without departing from the spirit or scope of the invention. Thus, for example, the task partitioning and distribution method of the present invention may be applied to VLSI design layout and floor planning, network reliability determination, web pages information relationship identification, and "divide and conquer" combinatorial problem solution approaches, e.g., the well known "Traveling Salesman Problem."

While the invention has been described in terms of preferred embodiments, those skilled in the art will recognize that the invention can be practiced with modification within the spirit and scope of the appended claims.

What is claimed is:

1. A task management method for determining optimal placement of task components, said method comprising:
  a) generating a communication graph representative of a task;
  b) identifying independent nets in said communication graph comprising steps of:
    i) selecting a seed node for an independent net,
    ii) identifying nodes adjacent to said seed node as perimeter nodes belonging to said independent net, perimeter nodes being an outer perimeter of nodes identified as belonging to said independent net, iii) identifying nodes adjacent to said perimeter nodes as belonging to said independent net, said identified adjacent nodes being identified as perimeter nodes; and iv) repeating step (iii) until all perimeter nodes are terminal nodes;

c) determining a min cut for each independent net; and d) placing said task components responsive to said min cut determined for each independent net.

2. A task management method as in claim 1, wherein the communication graph generated in step (a) comprises:

task components represented as said nodes of said communication graph; and edges connecting ones of said nodes representing communication between connected nodes.

3. A task management method as in claim 2, after the step (a) of generating a communication graph, further comprising the steps of:

a1) weighting edges, said edges being weighted proportional to communication between connected nodes; and a2) assigning terminal nodes, task components being placed on said terminal nodes in the task placing step (d).

4. A task management method as in claim 3, wherein before the step (i) of selecting a seed node, all nodes not being terminal nodes are marked as unvisited nodes.

5. A task management method as in claim 4, wherein in step (i) the seed node is marked as visited and perimeter nodes are marked as visited in steps (ii) and (iii).

6. A task management method as in claim 5, wherein all nodes marked as visited in steps (i)–(iv) identify an independent net, said method further comprising the steps of:

v) checking said communication graph for unvisited nodes; and, vi) repeating steps (i)–(v) whenever unvisited nodes remain in said communication graph.

7. A task management method as in claim 3, wherein the step (c) of determining a min cut comprises the steps of:

i) listing all independent nets as subgraphs in a subgraph list;

ii) selecting a subgraph from said subgraph list;

iii) applying a linear complexity method to said subgraph, if said linear complexity method divides said subgraph into two or more smaller independent nets, listing said smaller independent nets in said sub graph list and returning to step (i);

iv) checking whether said subgraph includes two or more smaller independnet nets, if said subgraph includes two or more smaller independent nets, identifying and listing said smaller independent nets in said subgraph list and returning to step (i);

v) applying a higher complexity method to said subgraph, said higher complexity method being more complex than said linear complexity method and, if said higher complexity method divides said subgraph into two or more smaller independent nets, listing said smaller independent nets in said subgraph list and returning to step (i);

vi) selectively collapsing an edge to reduce said subgraph, if collapsing said edge divides said subgraph into two or more smaller independent nets, listing said smaller independent nets in said subgraph list and returning to step (i); and vii) checking whether said subgraph list is empty.

8. A task management method as in claim 3, wherein each said task component is a unit of the computer program.

9. A task management method as in claim 8, wherein said each computer program unit is an instance of an object in an object oriented program.

10. A task management method as in claim 8, wherein in step (d) computer program units are placed on computers, computer program units being placed on a common computer being combined into a single component.

11. A distributed processing system for determining optimal placement of computer program components on multiple computers, said distributed processing system comprising:

means for generating a communication graph representative of a computer program;

means for identifying independent nets in said communication graph comprising:

means for selecting a seed node amongst nodes of said communication graph, and means for branching out from said seed node and identifying perimeter nodes adjacent until all perimeter nodes are terminal nodes;

means for determining a min cut for each independent net; and means for placing program components on ones of multiple independent computers responsive to said min cut determined for each independent net;

said computer program being executed by said multiple independent computers.

12. A distributed processing system as in claim 11, wherein the communication graph comprises:

a plurality of said nodes, each of said plurality of nodes representing one of said program components; and a plurality of edges connecting ones of said nodes, each of said edges representing communication between connected nodes.

13. A distributed processing system as in claim 12, further comprising:

weighting means for weighting said edges proportional to communication between connected said nodes and the communication graph further comprises terminal nodes, task components being placed on said terminal nodes.

14. A distributed processing system as in claim 13 further comprising means for marking nodes as unvisited nodes or as visited nodes.

15. A distributed processing system as in claim 14, wherein the marking means marks each perimeter node as visited, when all nodes in said communication graph are marked as visited all independent nets have been identified in said communication graph.

16. A distributed processing system as in claim 15, wherein the means for determining a min cut comprises:

means for maintaining a list of all independent nets;

linear complexity reduction means for selectively reducing listed independent nets;

higher complexity reduction means for selectively reducing listed independent nets using a method having higher complexity than used by said linear complexity means;

means for selectively collapsing independent net edges to reduce said listed independent nets;

means for checking whether any reduced independent net includes two or more smaller independent nets; and means for checking whether said list is empty.

17. A distributed processing system as in claim 16, wherein each said program component is a unit of the computer program.

18. A distributed processing system as in claim 17, wherein said each program unit is an instance of an object in an object oriented program.

19. A computer program product for partitioning a graph, said computer program product comprising a computer usable medium having computer readable program code thereon, said computer readable program code comprising:

computer readable program code means for identifying independent nets in a graph of a plurality of nodes connected together by a plurality of edges each of said edges being between a pair of adjacent said nodes, a plurality of said nodes being terminal nodes, said computer readable program code means for identifying independent nets comprising:

computer readable program code means for selecting a seed node;

computer readable program code means for identifying nodes adjacent to said independent net as perimeter nodes beginning at said seed node;

computer readable program code means for determining a min cut for each independent net; and computer readable program code means for assigning nodes to ones of said terminal nodes responsive to said min cut determined for each independent net.

20. A computer program product for partitioning a graph as in claim 19, wherein each of said plurality of edges includes a weight, said min cut for said each independent net being a cut of said independent net wherein the sum of weights of edges in said cut is minimum for said independent net.

21. A computer program product for partitioning a graph as in claim 20 wherein the computer readable program code means for identifying independent nets further comprises:

computer readable program code means for marking nodes as visited or unvisited nodes, said seed node and said perimeter nodes being marked as visited.

22. A computer program product for partitioning a graph as in claim 21, wherein the computer readable program code means for identifying independent nets further comprises:

computer readable program code means for checking for unvisited nodes.

23. A computer program product for partitioning a graph as in claim 20, wherein the computer readable program code means for determining a min cut comprises:

computer readable program code means for listing all independent nets as subgraphs in a subgraph list;

computer readable program code means for selecting a subgraph from said subgraph list;

computer readable program code means for applying a linear complexity method to selectively reduce said subgraph;

computer readable program code means for applying a higher complexity method to selectively reduce said subgraph said higher complexity method being more complex than said linear complexity method;

computer readable program code means for selectively collapsing an edge to reduce said subgraph;

computer readable program code means for checking whether said subgraph includes two or more smaller independnet nets, if said subgraph includes two or more smaller independent nets, identifying and listing said smaller independent nets in said subgraph list; and computer readable program code means for checking whether said subgraph list is empty.

24. A computer program product for partitioning a graph as in claim 20, wherein each said terminal node represents a computer, each of the remaining ones of said plurality of nodes is a unit of the computer program and each of said edges represents communication between connected computer program units.

25. A computer program product for partitioning a graph as in claim 24, wherein each computer program unit is an instance of an object in an object oriented program.

* * * * *